Aug. 5, 1924.
D'ORSAY McC. WHITE
1,503,571
UNIVERSAL JOINT AND HOUSING
Filed June 7, 1923
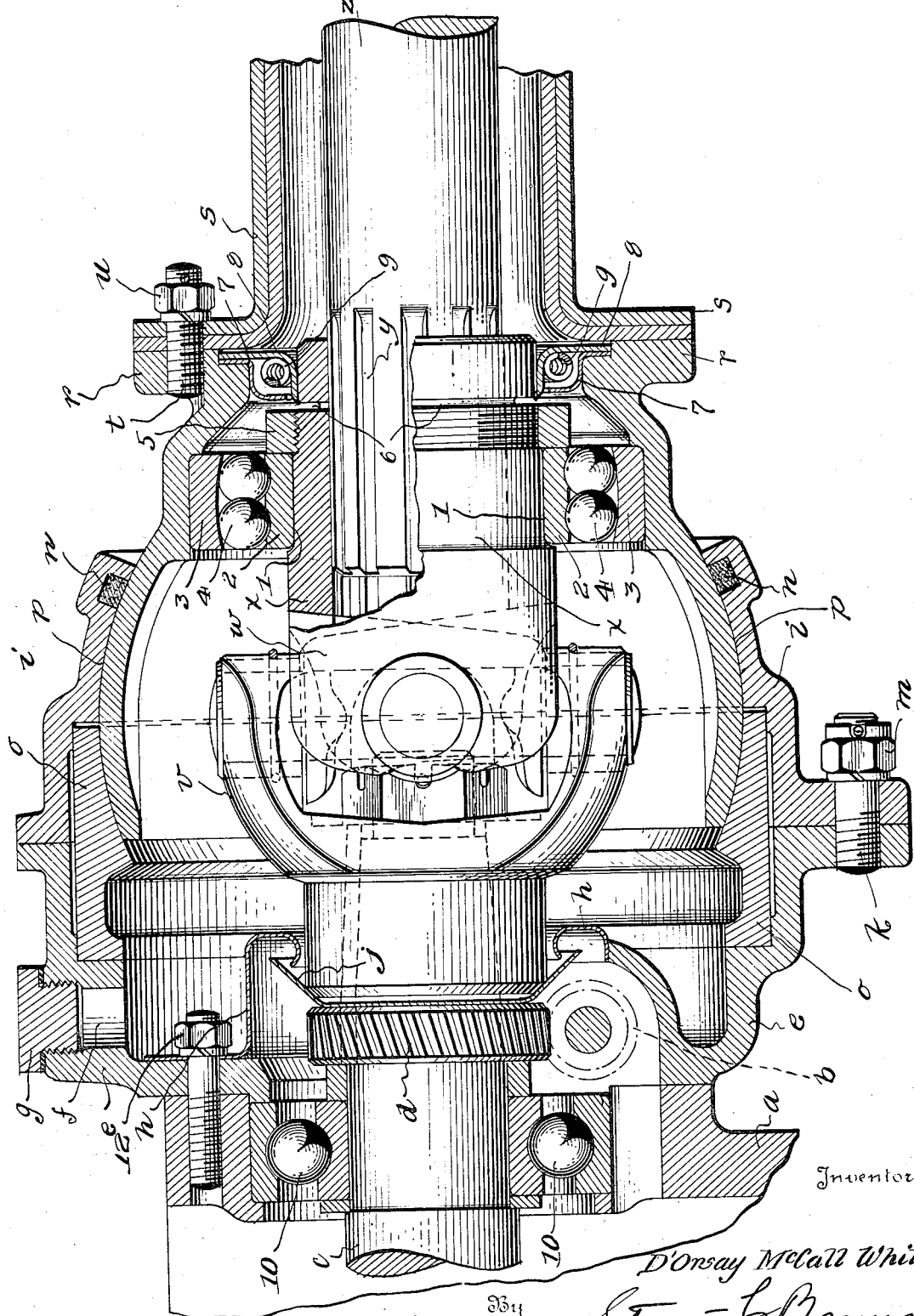
Inventor
D'Orsay McCall White
By Stuart C. Barnes
Attorney

UNITED STATES PATENT OFFICE.

D'ORSAY McCALL WHITE, OF DETROIT, MICHIGAN.

UNIVERSAL JOINT AND HOUSING.

Application filed June 7, 1923. Serial No. 643,863.

*To all whom it may concern:*

Be it known that I, D'ORSAY McCALL WHITE, a subject of Great Britain, residing at Detroit, in the county of Wayne and State of Michigan, have invented certain new and useful Improvements in Universal Joints and Housings, of which the following is a specification.

This invention relates to universal joints and universal joint housings. The invention is particularly applicable to universal joints and housings used in connection with the drive shaft and the so-called torque tube of an automobile. It is the object of the present invention to provide an improved assembly in which the propeller shaft can be disengaged from the universal joint unit simply by removing the nuts which hold the torque tube flange to the universal housing flange. The universal joint is intended for use with a rear axle which is so shackled to the chassis frame, that the torque tube can be thrown back a sufficient distance when the flanges are disengaged to permit the propeller shaft to be disengaged from the driven fork of the universal joint mechanism.

Another feature of the invention is that there is provided a ball bearing support for each fork so as to eliminate friction and make for nicer transmission of power through the universal joint parts. Provision is also made to prevent the grease or lubricant from escaping from the propeller shaft end of the joint. These and other features will be better understood when a detailed description is given.

The figure shown in the drawings is a longitudinal cross section of a universal joint and part of the transmission housing and torque tube.

*a* designates the transmission case; *c* the drive shaft on which is a gear *d* that drives the speedometer gear *b*. Bolted to the transmission case is the stationary universal joint housing section *e* which is provided with an oil or grease hole *f* closed by a screw plug *g*. The studs and nuts that hold the universal joint housing section to the transmission case also support an annular oil gutter *h* which serves to drain the oil thrown out of the transmission case back into the bottom of the case. A rotating guide flange or baffle *j* directs the oil into the gutter and consequently it drains around and down into the bottom of the transmission case and is not thrown into the universal joint where it is advisable to use a heavier grade of oil or grease.

A second stationary housing section *i* is bolted to the housing section *e* by the studs *k* and the nuts *m*. This housing section is provided with a packing ring *n*; the interior of this section, together with the bushing or insert *o*, forms a spherical bearing for the hollow ball, or movable section *p*. This ball section is provided with a flange *r* and may be bolted to the flange of the torque tube *s* by the threaded studs *t* and nuts *u*. The end of the drive shaft terminates in a fork or yoke *v*, while another fork which I term the driven fork *w*, has a hollow stem portion *x* which on its interior is longitudinally ribbed to receive the castellated end *y* of the propeller shaft *z*. The hollow stem *x* of the driven yoke is provided with a seat 1 for the inner ball ring 2 while the outer ball ring 3 seats in the ball section *p* of the housing. These ball rings and the balls 4 rotatably support the stem of the driven yoke in the ball housing of the universal joint. The nut 5, screws on to the threaded end of the stem to hold the ball cage to its seat on the stem. The stem is also grooved as at 6 to hold a spring washer that acts as a nut lock with respect to the nut 5.

A pair of thin metal washers 7 and 8 tend to prevent the grease from being thrown out into the torque tube through the unusually large orifice which is necessary in order to admit the nut 5. The packing washer 7 is shaped into the orifice of the housing while the packing washer 8 is shaped to provide an annular flange in engagement with the end of the yoke stem. The washer 7 forms the grease protection for the annular coiled restricting spring 9 which holds the outer washer 8 in place.

At the other end of the universal joint it will be seen that the ball bearing assembly 10 supports the driving shaft and the driving yoke with respect to the transmission case. Consequently, all the rotating elements of the universal joint are supported on ball bearings.

To disassemble these driving units, all that is necessary is to disengage the torque tube flange from the universal housing flange, the torque tube may then be moved backwards and the propeller shaft simply slides out of engagement with the universal joint driven yoke. The parts are thus completely separated. By removing the nut 5 and nuts m the two parts of the universal joint housing may be separated pulling with them the ball cage that supports the driven yoke. The universal joint yokes are now exposed for examination or repair. By removing the nuts 12 on the interior of the housing, the remainder of the universal joint housing may be removed from the transmission case.

It will be seen from this description that the assembly is comparatively simple, especially the assembly of the propeller shaft and the driven parts of the universal joint; no sleeves, pins or similar fastening arrangement being required whatever, the connection being a simple slip connection.

What I claim is:

1. In a universal joint and housing, the combination of a stationary housing section, a movable housing section, a torque tube bolted to the movable housing section, a driving yoke, a driven yoke, an anti-friction bearing assembly for rotatably supporting the driven yoke in the movable section, and a propeller shaft contained in the torque tube which may be disengaged by a sliding movement from the driven yoke, when the torque tube is detached from the movable housing member.

2. In a universal joint and housing, the combination of a stationary housing section, a movable housing section, a torque tube removably bolted to the later, a driving yoke rotatably supported in the housing, a driven yoke, an anti-friction bearing assembly for rotatably supporting the driven yoke in the movable housing section, a nut on the end of the driven yoke for holding the bearing assembly in place, and a propeller shaft contained in the torque tube and slidably disengagable from the driven yoke when the torque tube is disengaged from the movable housing member.

3. In a universal joint and housing, the combination of a stationary housing section, a movable housing section, a driving yoke rotatably supported in the housing, a driven yoke supported in the housing, an anti-friction bearing assembly for rotatably supporting the driven yoke within the movable housing section, the said driven yoke provided with a hollow interiorly and longitudinally ribbed stem, a torque tube removably fastened to the movable housing section, and a propeller shaft having a castellated end slidably engagable in the longitudinally ribbed interior of the driven yoke stem.

4. In a universal joint and housing, the combination of a stationary housing section, a movable housing section, a torque tube removably fastened to the movable housing section, a driving yoke rotatably supported in the housing, a driven yoke rotatably supported in the housing and having a hollow longitudinally and interiorly ribbed stem, an anti-friction bearing assembly for rotatably supporting the driven yoke and stem in the movable housing section, a propeller shaft having a castellated end having a sliding engagement with the longitudinally and interiorly ribbed hollow stem of the driven yoke, and a grease ring assembly for closing the space left between the end of the stem and the removable housing member.

5. In a universal joint and housing, the combination of a movable housing section, a stationary housing section, a torque tube removably secured to the movable housing section, a driving yoke rotatably supported in the housing, a driven yoke rotatably supported in the housing and provided with longitudinally and interiorly ribbed hollow stem, an anti-friction bearing assembly for rotatably supporting such stem in the movable housing section, a nut for holding the bearing assembly in place, and threaded on the end of the stem, a propeller shaft having a castellated end having a sliding engagement in the interior of the stem, and a grease ring assembly removably secured between the end of the stem and the housing to plug up the opening left for the removal of said nut.

In testimony whereof I affix my signature.

D'ORSAY McCALL WHITE.